(12) United States Patent
Brimble et al.

(10) Patent No.: US 8,103,701 B2
(45) Date of Patent: Jan. 24, 2012

(54) METADATA TO TECHNICAL DESIGN REVIEW DOCUMENT PROCESS

(75) Inventors: Paul Brimble, Glenhaven (GB); Samir Buche, Isleworth (GB)

(73) Assignee: Oracle International Corporation, Redwood Shores, CA (US)

( * ) Notice: Subject to any disclaimer, the term of this patent is extended or adjusted under 35 U.S.C. 154(b) by 542 days.

(21) Appl. No.: 12/117,182

(22) Filed: May 8, 2008

(65) Prior Publication Data
US 2009/0282065 A1      Nov. 12, 2009

(51) Int. Cl.
*G06F 7/00* (2006.01)
*G06F 17/00* (2006.01)

(52) U.S. Cl. ................ 707/803; 707/804; 707/805

(58) Field of Classification Search ............ 707/804, 707/805, 808, 792, 802, 803
See application file for complete search history.

(56) References Cited

U.S. PATENT DOCUMENTS

| | | | | |
|---|---|---|---|---|
| 5,301,270 | A * | 4/1994 | Steinberg et al. | 715/866 |
| 6,957,186 | B1 * | 10/2005 | Guheen et al. | 705/323 |
| 7,139,999 | B2 * | 11/2006 | Bowman-Amuah | 717/101 |
| 7,437,710 | B2 * | 10/2008 | Bau et al. | 717/117 |
| 7,472,118 | B2 * | 12/2008 | Hirst | 1/1 |
| 2002/0104071 | A1 * | 8/2002 | Charisius et al. | 717/109 |
| 2004/0064805 | A1 * | 4/2004 | Sparago et al. | 717/120 |

OTHER PUBLICATIONS

Thomas C. Hartrum (2007), Automated code generation tools for collaboration systems, pp. 183-190.*

* cited by examiner

*Primary Examiner* — Don Wong
*Assistant Examiner* — Merilyn Nguyen
(74) *Attorney, Agent, or Firm* — Marger Johnson & McCollom, P.C.

(57) ABSTRACT

A method includes receiving a user input in a design environment indicating at least one software component for which a technical design document is desired, identifying files in which information associated with the component is located, accessing the information, and formatting the information according to a technical design document template. A system has a design environment for development of software components, and a document generator to automatically generate documentation for the software components on demand. A method to design software components includes producing a design of a software component in a design environment residing upon a computer, selecting the software component for design review, and generating a design document according to a template from the design environment.

7 Claims, 5 Drawing Sheets

METADATA TO TECHNICAL DESIGN REVIEW DOCUMENT PROCESS

BACKGROUND

Software developers may document the control of the definition and structure of a technical design in a 'text program' such as Microsoft® Word® that provides a comfortable format for most parties involved in the design process. This text document then needs conversion from text to code.

Developers then generally have to code the design from the document, which can lead to errors because of mis-typing or the addition of incorrect information. Alternatively, the developers may have access to an auto code generator that can automatically code into whatever programming language used.

Once the developers complete the coding of the design, a painstaking review is required to ensure that the technical design was converted into code correctly. This process generally takes a relatively long time and requires a very high level of attention to detail. This process is contrary to the movement towards rapid application development in the software industry.

Another issue arises upon completion, or 'build,' of the software component. Generally, the build occurs in an integrated development environment (IDE), such as JDeveloper™ created by Oracle®. The developer must then compare the technical design document in the text program to the built component, which may be represented by a collection of multiple source files. This makes tracking of changes caused by code fixes and other changes during the build process hard to identify. The task of ensuring that the built component matches the designed component requires more painstaking and time-consuming review.

DETAILED DESCRIPTION OF THE EMBODIMENTS

Figure 1:
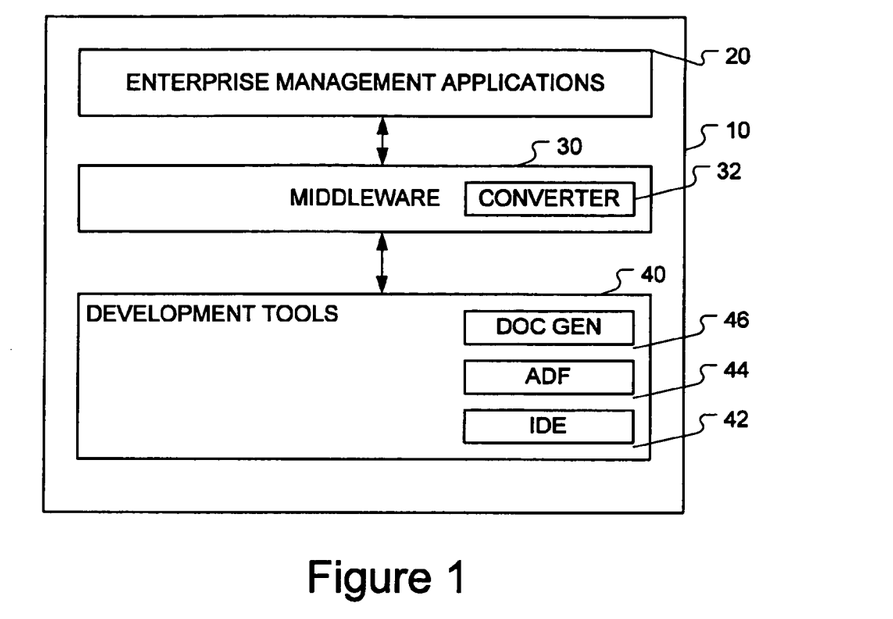
FIG. 1 shows a block diagram of one embodiment of relationships between enterprise management applications and development tools.

FIG. 1 shows an architecture of a software system, from software development through enterprise management applications. Developers use development tools 40 to create the code that customers will eventually deploy to manage their businesses as enterprise management applications 20. These two components communicate and work together using 'middleware' 30. The development tools may include an integrated development environment (IDE) 42, which in turn may work with an application development framework 44.

An integrated development environment, as used here, generally exists in a computing system. IDEs typically present a suite of programs within an interface in which all development is done. This suite provides typically large numbers of features for authoring, modifying, compiling, deploying and debugging software—the idea being that the IDE abstracts the configuration necessary to piece together command line utilities in a cohesive unit, which theoretically reduces the time to learn a language, and increases developer productivity. It is also thought that the tight integration of various development tasks can lead to further productivity increases. For example, code can be compiled while being written, providing instant feedback on syntax errors.

In some instances, a developer may also have an application framework 44 available. An application framework may include support programs, code libraries, a scripting language, or other software to help develop and glue together the different components of a software project. Various parts of the framework may be exposed through an application programming interface (API). Typically, an application framework has a specific programming language for which it has been adapted.

The application framework and integrated design environment are just examples of a design environment in which development is done. Similarly, the document generator 46 is part of the design environment. As will be discussed in more detail further, the document generator may merely comprise an interface to the converter 32 of the middle ware. The converter 32 and the document generator 46 may also be mutually exclusive locations at where the document production facility resides to allow developers to create technical design documents.

Examples used here may refer to the Java™ 2 Enterprise Edition (J2EE) and its successor Java™ EE 5 as an integrated development environment. In addition, the examples may refer to Oracle's Application Development Framework (ADF) as an application framework. These are used to aid in understanding of the discussion and no limitation to these particular examples is intended, nor should one be implied.

Similarly, the applications discussed here are generally referred to as 'enterprise management applications,' typically banking, human resources, inventorying, e-commerce, etc., types of applications. However, any applications that result from a development process that may also include middleware may be used.

In the architecture of FIG. 1, the middleware may have other tools that adapt the code developed in 40 for particular applications in 20. One such example may be a converter or formatter 32 that may convert documents or other such items from the development tools to a format that is viewable in a structured format. This converter may be a custom designed and built tool, or may be an adaptation of an existing converter, such as Oracle's Business Intelligence (BI) Publisher. The converter 32 may be extensive enough to take information, generally in some sort of textual format although it may also include other file formats such as Binary file format, from several disparate places and create reports, graphs and other documentation useful to the customers using the enterprise management applications.

It is possible to employ the publisher, or a similar function, located in the middleware, or as an application, to alter the typical design, review, build process used in developing the software components that underlie applications. Currently, the publishers are adapted for and used to generate reports for the end users. By modifying the development tools available to software developers, one could provide a document generator 46 to be used in the design process.

Figure 2:
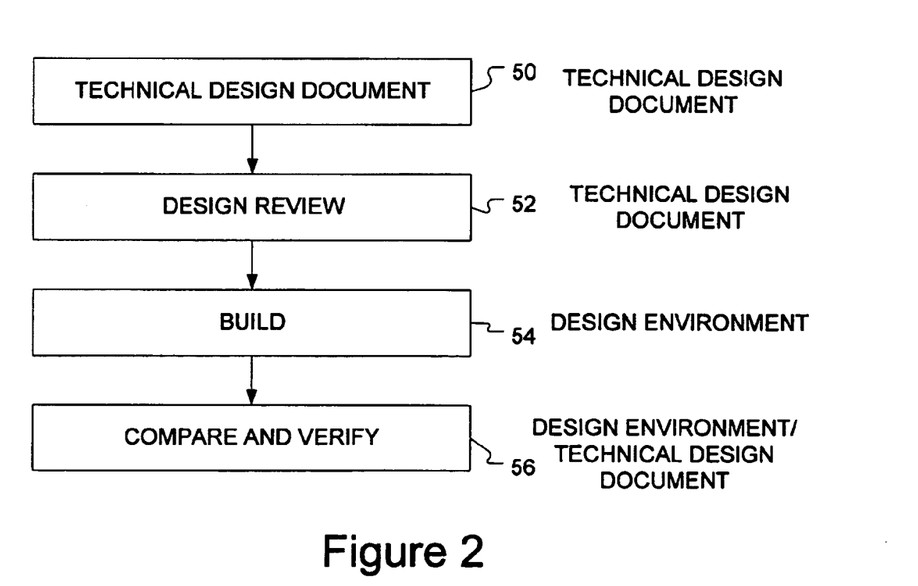
FIG. 2 shows a flowchart of an embodiment of a method of developing software components.

FIG. 2 shows a typical design, review and build process. Generally, the term 'software component' will refer to a contained segment of code, a unitary or bounded segment of code that performs single task and may be re-usable across application programs. The segment may make calls to other code, pass variables, etc. It is not independent or stand alone code, it is merely a logical piece of an overall software project.

In the current design and build cycle, a software component, such as an ADF component is designed is the design environment/development tools 40 of FIG. 1. A technical design document is then created from the design environment. This design is then published by e-mail routing, printing, etc., and then undergoes technical design review at 52. Publication may also involve sending out a notification that the technical design document is available in the design environment for the recipients to review, rather than publishing the document itself. Changes to the design must be implemented in the technical design document, and possibly re-reviewed before ultimately receiving approval.

Upon receiving approval, the component is 'built,' at 54 meaning that it is coded, generally in the integrated development environment (IDE) or other design environment. During the course of building the component, changes may occur in the coding due to code fixes or additional information that comes to light during the build. These changes may result in design changes that render obsolete the technical design document produced at 50.

Upon completion and testing of the component at 56, the design document may require updating. The design document will generally be compared to the resulting component, to ensure that deviations from the approved design were necessary. This process generally involves a developer having to view several different files that interact to form the component, as well as the design document, simultaneously. The process has a high probability for error, resulting in the process taking great amounts of time and effort to accomplish it correctly.

Figure 3:
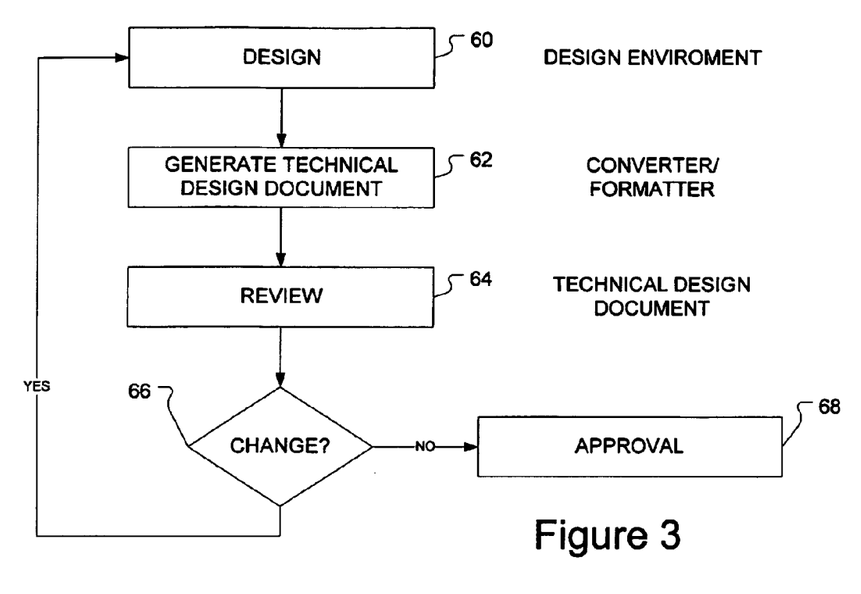
FIG. 3 shows a flowchart of an embodiment of a design process using this converter at the development stage.

As mentioned above, using a converter that can convert multiple codes files and/or segments into a structured text document for review. As mentioned above, this converter could be a custom designed tool, or an adaptation to a previously-existing publication tool. FIG. 3 shows a flowchart of an embodiment of a design process using this converter at the development stage.

The process begins in the design environment at 60. The component to be built is designed in the design environment, rather than in a text document. Once the design is completed, including any changes necessary during preliminary reviews, a developer would access an interface to a publisher that would allow the publication of the technical design in a familiar document format, or provide a means to notify reviewers of the availability of the technical design document in the design environment.

Providing a converter that can take information from several different code files and/or segments and generate a structured document, such as a technical design document is a capability that is not currently available. The technical design document may be generated for differing levels of code segments/files. FIGS. 4-7 show examples of a user interface for generation and routing of the technical design document and provide an example of a technical design document for one code segment identified from the integrated development environment.

This capability alters the design process discussed with regard to FIG. 2. In FIG. 3, the design occurs in the design environment and the design environment generates the necessary data for the necessary files related to the component at 62. This process may involve the use of a design document template that provides the document generator in the design environment to format the extracted text into an appropriate format prior to publication. The design document is then published for review.

The resulting text document undergoes review at 64 by reviewers who are used to reviewing technical designs in text format. If the reviewers make a change at 66, the process returns to the IDE for design changes and the process would repeat itself. An additional advantage here occurs with regard to changes. Generally, in software designs, changes may be documented in comment lines in the code, sometimes referred to as a change control section. When the text is extracted by the converter/formatter at 62, the resulting document will have an automatically generated change control section, facilitating further reviews and assisting during the course of the build, which would occur after approval at 68.

Figure 4:
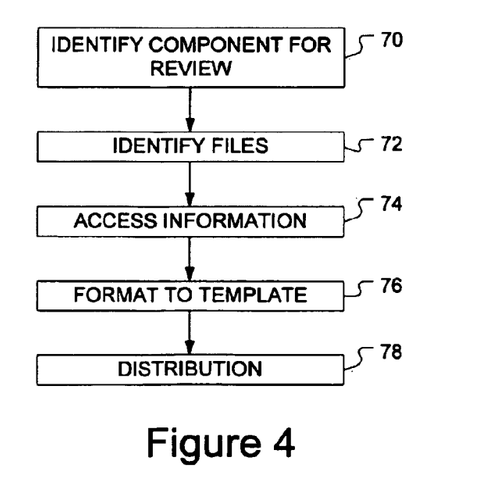
FIG. 4 shows a flowchart of an embodiment of a method to generate a technical design document.

Prior to discussing the changes this process brings to the building of the component, it may be useful to discuss in more detail a specific example of a document generation process. FIG. 4 shows a flowchart of an embodiment of the document generation process. At 70, the process identifies a component for review. This will generally occur at a user interface, such as where a developer selects a component from a directory of components that have been designed. The developer would then select 'generate document' or 'produce design review document,' or a similar selection to launch the document generation process.

The document generation process may then identify the files related to that component at 72. In the design environment, a component may have multiple files related to it, as well as the component itself distributed among several different files. The document generator could locate the files and provide them to the converter, or it could actually gather the information and provide the information to the converter at 74. This process may also include preformatting the file to allow the document generator to extract the information. The information would more than likely have to be formatted to a technical design review document format at 76, to facilitate publication/distribution at 78. While using a pre-existing publisher, such as Oracle's BI Publisher, has been mentioned, it is also possible that the design environment would include its own converter utility.

Once the design environment and/or publisher have produced the design document, it would then distribute it to reviewers automatically, such as by e-mail, fax, remote printing at the reviewer's networked printers, or merely by a notifying e-mail that the document is available for review. Returning briefly to FIG. 3, the review cycle could then commence within the design environment at 62, rather than outside the IDE and then have to enter into it after review as in FIG. 2.

Figure 5:
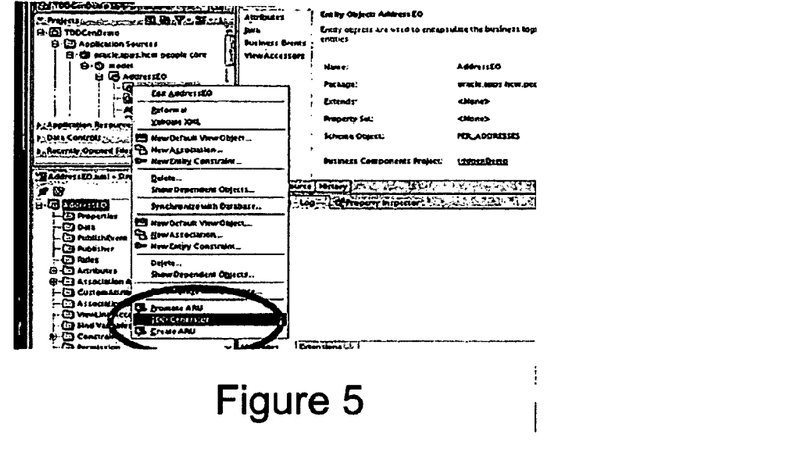
FIG. 5 shows an embodiment of a user interface to access a technical design document generator.
Figure 6:
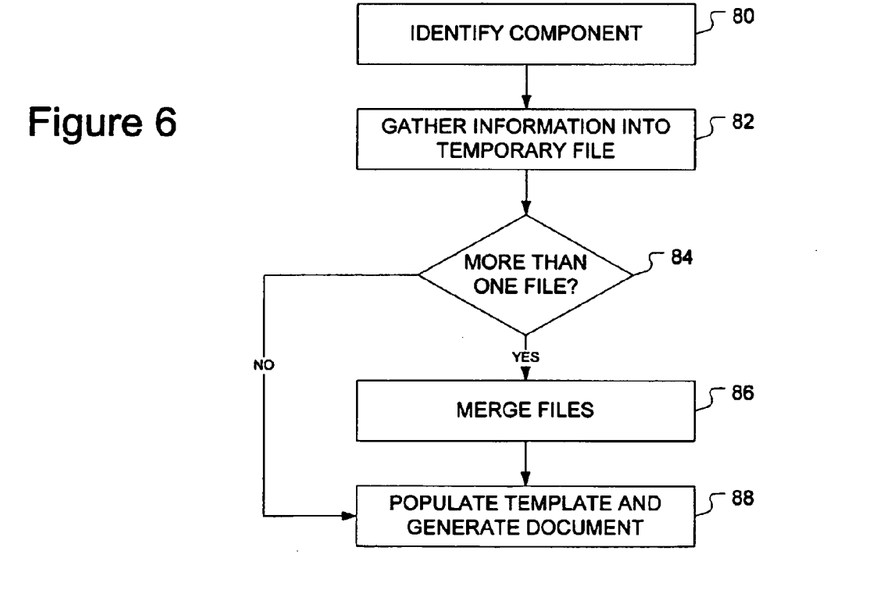
FIG. 6 shows an embodiment of a method to convert design files into a technical design document.
Figure 7:
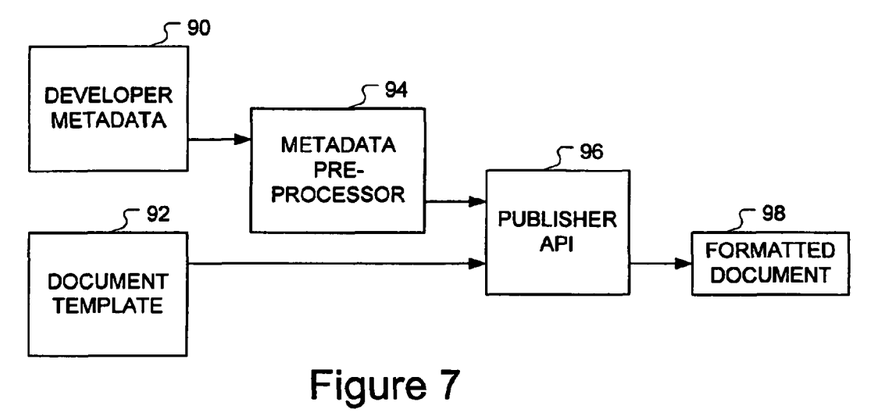
FIG. 7 shows an embodiment of a converter to generate a technical design document.

FIG. 5 shows selection of a technical design document (TDD) generator from a user interface in a design environment. For this particular example, the component being selected for which a document is to be generated is the component AddressEO, where 'EO' stands for 'entity object.' FIGS. 6 and 7 are discussed in conjunction with an embodiment of generating the technical design document. The specific file names and extensions are merely examples and are not intended to limit the scope nor such any limitation be implied.

In FIG. 6, the component is identified at 80. This may involve the user making a selection from the design environment user interface, right-clicking on that component and then selecting 'TDD Generator' as shown in FIG. 5. The converter 32 of FIG. 1 then extracts metadata from necessary files into a single formatted file at 82, such as an XML file, AddressTemporary.xml. This file is temporary and stored in a predetermined private location for the converter.

The converter determines if there is more than one file that stores information about the shape and behavior of objects at 84. In the example above, the AddressEO.xml file stores the information about the shape of the object which includes Address, Street, Town, etc. The 'Address' entity object is also related to 'Person' entity object. This relationship is stored in another file PersonEOToAddressEO.xml. The converter would then merge these two files, AddressEO.xml and PersonEOToAddressEO.xml, at 86. This merged file, AddressTemporary.xml, is then used to populate a template at 88, which results in the technical design document being generated. If there is only one file that defines the shape and behavior of the object at 84, the merge process would be skipped. Examples of AddressEO.xml and PersonEOToAddressEO.xml, as well as the merged file AddressTemporary.xml are shown in the Appendix.

Generally, the template may be a rich text format (*.rtf) or other formatted text file. The information in the temporary file is used to populate the template. An example of a template is shown below (EOTemplate.rtf).

| | |
|---|---|
| Physical Table Name | <Table Name added by TDD Generator> |
| Business Object Name | <BusinessObject added by TDD Generator> |
| Status <Changed\|New\|Obsolete> Package Name Description | <Text added by TDD Generator> |
| EO Base Class | <Class Name added by TDD Generator> |
| EO Properties | <Properties added by TDD Generator> |
| PL/SQL based <Y/N> | <Y/N added by TDD Generator> |
| EO Primary Key Attribute | <Attributes added by TDD Generator> |

In the templates the named place holders are created for storing information about object shape and behavior. The templates are created for each object using text structure agreed upon for documentation. The convertor uses the appropriate template depending upon the object in process.

Once the convertor creates the temporary XML file, such as AddressTemporary.xml, and identifies the template to be used, the information is copied from the XML file to the appropriate place holder attributes of the appropriate template, such as EOTemplate.rtf shown above. The copying can be done in several ways, include a proprietary coded document extraction utility or a pre-existing tool, such as BI Publisher mentioned earlier. In either case, the utility would provide interface for writing XML data to the place holders of the text document template, such as RTF or MS-Word.

An example of a generator is shown in FIG. 7. The convertor 90 extracts the metadata from the developer, such as JDeveloper for Java files. The metadata is then handed off to the metadata pre-processor 94 that determines if any merge files are necessary, and if so, prepares the merged files. The merged file is then passed to the publisher application program interface (API) 96, along with the document template 92. The converter then produces the formatted document at 98.

When the converter completes the generated text document, it can then copy it to the public area accessible to end user and also sends an e-mail if an address was provided during the TDD Generation request. In an embodiment, when the user highlights the TDD Generator in the design environment, the user is prompted for an e-mail address to which the resulting document can be sent.

Figure 8:
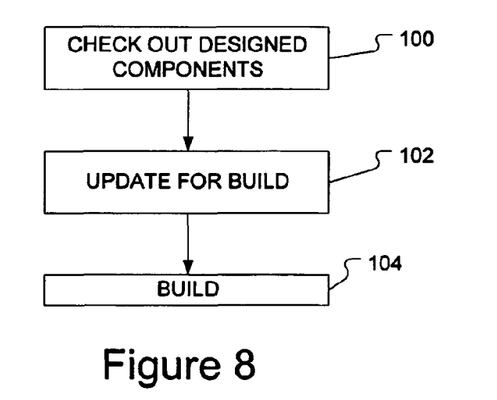
FIG. 8 shows a flowchart of an embodiment of a method to update a design document from a development environment.

By generating the technical design document from the development environment, the build process also becomes more efficient and less error-prone. FIG. 8 shows a flowchart of an embodiment of a build process using the technical design document from the IDE. At 100, the developer could 'check out' a selected component that has already undergone design and approval. Because the initial design and any changes occurred in the design environment, the developer only has to update any aspects of the component to prepare it for the build at 102.

As mentioned previously, as the developer is working directly on the design in the design environment, any code changes or additional information that comes into the process can be documented in the code itself. This could then be generated as an updated design document upon code completion at 104, avoiding the time-consuming and error-prone process of reconciling code changes to the original design document discussed earlier.

In addition, because the design elements are already entered into the design environment, and only have to be entered once, the previous step of having to 'enter' the information from the technical design document, either by manual or automatic coding, has been eliminated. This supports rapid application development and reduces the likelihood of entry errors.

Figure 9:
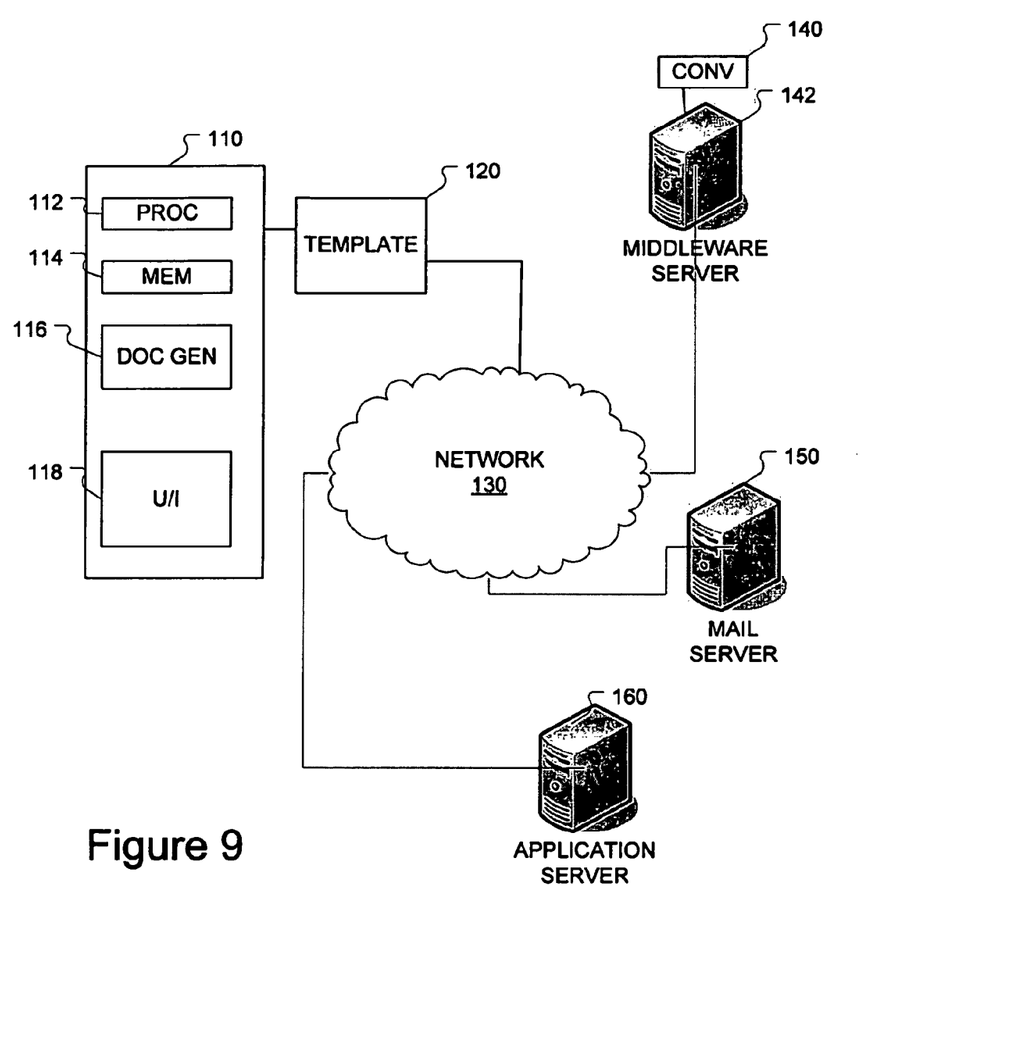
FIG. 9 shows an embodiment of a system to develop software components.

FIG. 9 shows an embodiment of a system in which the design environment adapted to generate documents could operate. Obviously, the implementation of particular functions or capabilities located in one or the other computer system is merely one example of these locations and is not intended to limit the scope of the claims.

In FIG. 9, a computer system 110 is shown as being entirely self-contained, whereas it may be distributed across multiple computers. The computer system 110 will typically include a processor 112, a memory 114 and a user interface such as a display 116. A developer may employ the processor to operate the design environment and application framework in which the design is developed.

The network 130 to which the computer system 110 is attached may also have an applications server 160 and a middleware server 142 as part of the overall system architecture. All of these servers may be combined into one server, or matched up differently that as shown.

In one embodiment of operation of the overall system in FIG. 9, a developer designates a software component on the system 110 for which a design document is desired through the user interface 118. This designation would occur within the design environment or application framework. The processor may access the middleware server 142 to launch the publisher/converter 142, or the processor may locate the document generation capability within the system 110. The document generator 116 would then extract the information necessary from the appropriate files, which may be distributed anywhere in the architecture, and format the information into the template 120 for publication. As mentioned previously, publication may involve distribution by e-mail, possible employing mail server 150 on the network.

Regardless of how the computing resources are distributed, embodiments of the methods described here may be contained as instructions on a computer-readable medium. When accessed by a processor, such as 112, the instructions would cause the computer to execute the processes discussed above within the scope of the invention.

In this manner, the design, review and build cycle has been altered because of a document generation capability having been provided from within a design environment, whether that environment involves an application framework or not.

Thus, although there has been described to this point a particular embodiment for generation of a design document from within an integrated development environment, it is not intended that such specific references be considered as limitations upon the scope of this invention except in-so-far as set forth in the following claims.

APPENDIX

```xml
AddressEO.xml
<AccessorAttribute
  Name="Person"
  Association="oracle.apps.hcm.people.core.model.entity.association.PersonEOToAddressEO"
  AssociationEnd="oracle.apps.hcm.people.core.model.entity.association.PersonEOToAddressEO.Person"
  AssociationOtherEnd="oracle.apps.hcm.people.core.model.entity.association.PersonEOToAddressEO.Address"
    Type="oracle.apps.fnd.applcore.oaext.model.OAEntityImpl"
    IsUpdateable="true"/>
PersonEOToAddressEO.xml
  <AssociationEnd
    Name="Person"
    Cardinality="1"
    Source="true"
    Owner="oracle.apps.hcm.people.core.model.entity.PersonEO"
    LockLevel="NONE">
    <AttrArray Name="Attributes">
      <Item Value="oracle.apps.hcm.people.core.model.entity.PersonEO.PersonId"/>
    </AttrArray>
    <DesignTime>
      <Attr Name="_minCardinality" Value="1"/>
      <Attr Name="_isUpdateable" Value="true"/>
      <Attr Name="_finderName" Value="Person"/>
      <Attr Name="_aggregation" Value="0"/>
    </DesignTime>
  </AssociationEnd>
  <AssociationEnd
    Name="Address"
    Cardinality="-1"
    Owner="oracle.apps.hcm.people.core.model.entity.AddressEO"
    HasOwner="true"
    UpdateHistoryColumn="true">
    <AttrArray Name="Attributes">
      <Item
        Value="oracle.apps.hcm.people.core.model.entity.AddressEO.PersonId"/>
      </AttrArray>
      <DesignTime>
        <Attr Name="_isUpdateable" Value="true"/>
        <Attr Name="_finderName" Value="Address"/>
        <Attr Name="_aggregation" Value="0"/>
      </DesignTime>
  </AssociationEnd>
AddressTemporary.xml
  <AccessorAttribute
    Name="Person"
    Association="oracle.apps.hcm.people.core.model.entity.association.PersanEOToAddressEO"
    AssociationEnd="oracle.apps.hcm.people.core.model.entity.association.PersonEOToAddressEO.Person"
  <AssociationEnd
    Name="Person"
    Cardinality="1"
    Source="true"
    Owner="oracle.apps.hcm.people.core.model.entity.PersonEO"
    LockLevel="NONE">
    <AttrArray Name="Attributes">
      <Item Value="oracle.apps.hcm.people.core.model.entity.PersonEO.PersonId"/>
    </AttrArray>
    <DesignTime>
      <Attr Name="_minCardinality" Value="1"/>
      <Attr Name="_isUpdateable" Value="true"/>
      <Attr Name="_finderName" Value="Person"/>
      <Attr Name="_aggregation" Value="0"/>
    </DesignTime>
  </AssociationEnd>
AssociationOtherEnd="oracle.apps.hcm.people.core.model.entity.association.PersonEOToAddressEO.Address"
  <AssociationEnd
    Name="Address"
    Cardinality="-1"
    Owner="oracle.apps.hcm.people.core.model.entity.AddressEO"
    HasOwner="true"
    UpdateHistoryColumn="true">
    <AttrArray Name="Attributes">
      <Item
        Value="oracle.apps.hcm.people.core.model.entity.AddressEO.PersonId"/>
      </AttrArray>
      <DesignTime>
        <Attr Name="_isUpdateable" Value="true"/>
        <Attr Name="_finderName" Value="Address"/>
```

APPENDIX-continued

```
    <Attr Name="_aggregation" Value="0"/>
   </DesignTime>
 </AssociationEnd>
 Type="oracle.apps.fnd.applcore.oaext.model.OAEntityImpl"
 IsUpdateable="true"/>
```

What is claimed is:

1. A system, comprising:
a computing system having a processor, a memory and a user interface, the processor having access to the memory, the memory containing instructions stored on non-transitory computer-readable media that includes:
an integrated development environment for development of software components; and
a document generator to automatically generate a technical design document for the software components on demand, the document generator comprising:
a converter to extract metadata from the integrated development environment;
a metadata pre-processor to analyze the metadata and determine if any merged files are needed; and
an application program interface to produce the technical design document using the converter.

2. The system of claim 1, wherein the application program interface comprises an interface to a publishing tool from the integrated development environment.

3. The system of claim 1, wherein the integrated development environment further comprises a Java development environment.

4. The system of claim 1, wherein the software components comprise application development framework components.

5. The system of claim 1, further comprising a network in communication with the computing system.

6. The system of claim 5, further comprising at least one of a middleware server, an applications server, and a mail server.

7. The system of claim 5, further comprising a publisher/converter.

* * * * *

UNITED STATES PATENT AND TRADEMARK OFFICE
CERTIFICATE OF CORRECTION

| | | |
|---|---|---|
| PATENT NO. | : 8,103,701 B2 | Page 1 of 1 |
| APPLICATION NO. | : 12/117182 | |
| DATED | : January 24, 2012 | |
| INVENTOR(S) | : Brimble et al. | |

It is certified that error appears in the above-identified patent and that said Letters Patent is hereby corrected as shown below:

On sheet 2 of 5, in figure 3, line 1, delete "ENVIROMENT" and insert -- ENVIRONMENT --, therefor.

In column 7-8, line 45, delete "Persan" and insert -- Person --, therefor.

Signed and Sealed this
Tenth Day of April, 2012

David J. Kappos
*Director of the United States Patent and Trademark Office*